(No Model.)
H. M POWEL.
Car Starter.
No. 234,330. Patented Nov. 9, 1880.
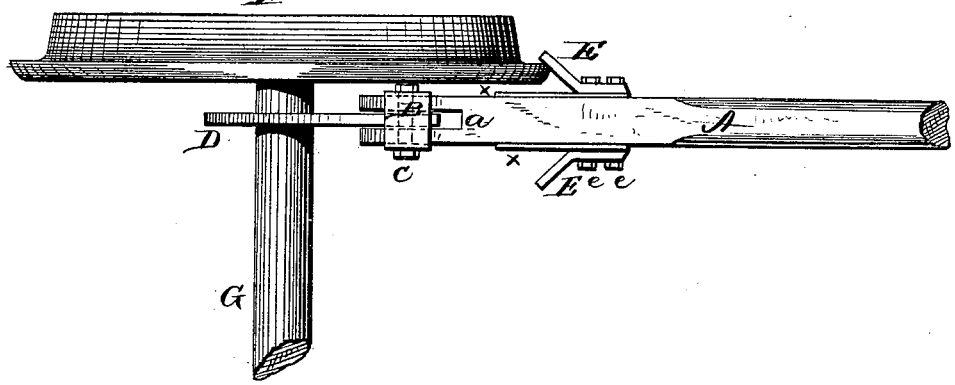
Witnesses.
Frank L. Ourand.
J. J. McCarthy.
Inventor.
Howard M. Powel
By Alexander & Mason
atty

UNITED STATES PATENT OFFICE.

HOWARD M. POWEL, OF TAYLORVILLE, ILLINOIS.

CAR-STARTER.

SPECIFICATION forming part of Letters Patent No. 234,330, dated November 9, 1880.

Application filed September 21, 1880. (No model.)

*To all whom it may concern:*

Be it known that I, HOWARD M. POWEL, of Taylorville, in the county of Christian, and in the State of Illinois, have invented certain new and useful Improvements in Car-Starters; and I do hereby declare that the following is a full, clear, and exact description thereof, reference being had to the accompanying drawings, and to the letters of reference marked thereon, making a part of this specification.

The nature of my invention consists in the construction and attachment to a lever of a hook and clamps in such manner that the axle of a car and the rim of the car-wheel may be simultaneously grasped for the purpose of giving a partial rotation to the wheel for starting same, as will be hereinafter more fully set forth.

To enable those skilled in the art to make and use my invention, I will proceed to describe its construction and operation.

In the annexed drawings, making part of this specification, Figure 1 represents a plan view of my lever, showing the hook and clamps and their relation to the axle and rim of a car-wheel when in use. Fig. 2 represents a side view of the lever and its appendages.

In the drawings, A represents a lever, which is made preferably about six feet in length. A slot, $a$, is cut in one end of the lever, and in this slot is inserted and pivoted one end of a hook, D.

B represents a metal band which surrounds the lever at its slotted end, and C represents a bolt which passes through it and through the lever and hook to secure the same firmly together.

$x$ $x$ represent two flat metallic plates which are placed upon two sides of the lever, and E E represent two angular plates which are placed upon them and secured fast to the lever by means of the bolts $e$ $e$. The angles are toward the end of the lever which bears the hook.

The distance between the plates E E and the inner surface of the hook is greater than the distance from the outer edge of the flange of the car-wheel to the opposite side of the axle.

To apply this instrument for the purpose of starting a car, the hook D is first caught over the axle; the joint between the lever and hook is then bent until the flange of the wheel is caught in the angle of one of the plates E; then by the use of the outer end of the lever the axle and flange are clamped simultaneously, and the power of the operator can thus be applied to the periphery of the wheel for the purpose of giving it a partial rotary motion, or starting it. The lever is readily detached or relieved for a new grasp by simply reversing the motion by which the wheel and axle are clamped.

Having thus fully described my invention, what I claim as new, and desire to secure by Letters Patent, is—

The combination of the lever A, having a hook, D, and the detachable plates $x$ $x$ and E E, secured to the lever by bolts $e$ $e$, substantially as specified.

In testimony that I claim the foregoing I have hereunto set my hand this 3d day of August, 1880.

HOWARD M. POWEL.

Witnesses:
F. H. HARRISON,
W. B. WILKINS.